United States Patent
Nakamura

(10) Patent No.: US 6,487,152 B1
(45) Date of Patent: Nov. 26, 2002

(54) METHOD OF RECORDING INFORMATION IN PHASE-CHANGE RECORDING MEDIUM AND RECORDING MEDIUM FOR USE IN THE METHOD

(75) Inventor: Yuki Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/670,220

(22) Filed: Sep. 25, 2000

(30) Foreign Application Priority Data

Sep. 27, 1999 (JP) .......................................... 11-273061

(51) Int. Cl.$^7$ ................................................. G11B 7/00
(52) U.S. Cl. ................. 369/47.53; 369/53.1; 369/59.12
(58) Field of Search ............................ 369/47.1, 47.11, 369/47.24, 47.28, 47.5, 47.52, 53.1, 53.11, 53.22, 53.26, 59.1, 59.11, 59.12, 59.13, 59.17, 116, 275.1, 275.4

(56) References Cited

U.S. PATENT DOCUMENTS

| | | | |
|---|---|---|---|
| 5,642,343 A | * 6/1997 | Toda et al. | ............. 369/116 X |
| 5,736,657 A | 4/1998 | Ide et al. | ....................... 75/230 |
| 5,974,025 A | 10/1999 | Yamada et al. | ............. 369/288 |
| 6,157,609 A | * 12/2000 | Shoji et al. | ............... 369/275.3 |

OTHER PUBLICATIONS

U.S. patent application Ser. No. 08/979,293, Y. Ide et al., filed Nov. 26, 1997.
U.S. patent application Ser. No. 09/199,472, K. Hattori et al., filed Nov. 25, 1998.
U.S. patent application Ser. No. 09/471,345, K. Hattori et al., filed Dec. 23, 1999.

* cited by examiner

Primary Examiner—Muhammad Edun
(74) Attorney, Agent, or Firm—Cooper & Dunham LLP

(57) ABSTRACT

A method of recording information in a phase-change recording medium, including the steps of conducting a test recording, using a laser beam including a plurality of pulse trains, each pulse train including alternately (a) a comb-shaped pulse train portion and (b) a flat pulse-free portion, or using a laser beam including a comb-shaped pulse train pulse train portion without including the flat portion, with a duty ratio of the comb-shaped pulse train portion being changed, thereby recording a plurality of signals or laser-beam applied portions in the recording medium, reproducing the plurality of recorded signals, or measuring the light intensities reflected by the laser-beam applied portions and converting the measured light intensities to voltages and obtaining the relationship between the amplitudes of the signals reproduced from the recorded signals or the voltages and the duty ratios corresponding thereto in order to specify a pulse strategy for recording information in the phase-change recording medium, and a phase-change recording medium produced by this method of recording are proposed.

22 Claims, 6 Drawing Sheets

METHOD OF RECORDING INFORMATION IN PHASE-CHANGE RECORDING MEDIUM AND RECORDING MEDIUM FOR USE IN THE METHOD

Japanese Patent Application No. 11-273061 filed Sep. 27, 1999 is hereby incorporated by reference.

BACKGROUND OF THE INVENTION

1. Field of the Invention

The present invention relates to a method of recording information in a phase-change recording medium comprising a phase-change material in a recording layer thereof, which phase-change material is capable of recording information in a rewritable manner and reproducing recorded information by being subjected to phase change at the irradiation with a laser beam. The present invention also relates to a phase-change recording medium produced by the method of recording information of the present invention, such as a rewritable compact disk (CD-RW), and other recording media for use in optical memory appliances.

2. Discussion of Background

As described in Japanese Laid-Open Patent Application 63-29336, there is conventionally known a method of recording information signals in an optical disk, using an optical disk recording apparatus, by causing a laser beam to scan the optical disk in such a manner that the surface of the optical disk is irradiated with a light spot of the laser beam, for instance, with the light spot of the laser beam being subjected to power modulation with information signals.

Furthermore, there is conventionally known a method of determining or setting optimum recording conditions such as recording (light) power, and the pulse width of recording (light) power by reproducing the information signals recorded in the optical disk and monitoring the reflection amplitudes of the reproduced signals or the length of a recording mark.

Various recording compensation methods have been disclosed for improving the quality of recording signals in the phase-change recording.

For example, in Japanese Laid-Open Patent Application 63-26632, as an effective method for improving the quality of recording signals, there is disclosed a method of recording long amorphous marks, using a pulse train in a PWM (pulse width modulation) method by use of a recording film with a high crystallization speed.

Furthermore, in Japanese Laid-Open Patent Application 63-266633 and U.S. Pat. No. 5,150,352, there is disclosed a method of controlling the fluctuations of the positions of the edge portions of a recording mark for marking an improvement in the reduction of the jitters by increasing the laser energy at the leading edge and the tail-end edge of a pulse train, or by lengthening laser irradiation time.

Orange Book Part III (ver 2.0) provides the standard of CD-RW for line recording at one to quadruple speeds (1.2 to 5.6 m/s). Such low line speeds take a long time for recording, so that there has been a demand for a rewritable compact disk capable of performing rewritable recording at higher speed.

Due to the above disclosed prior art, phase-change disks and optical disk drives having excellent performance have been made available. However, there has been desired further improvement on the technology for producing the optical disk and optical disk drive in order to obtain an optical disk which is securely compatible with CD-R (recordable), and an optical disk drive for use with the optical disk, which have completely satisfactory performance in overall aspects thereof, and which can create a new market of optical disk and optical disk drive.

By use of the conventional methods, however, it is extremely difficult to find most appropriate recording conditions without fail even if information signals are recorded in the conventional optical information recording media by a conventional, ass-produced optical information recording and reproducing apparatus for the following reasons:

In the above-mentioned conventional methods, there is known a method for determining a most appropriate recording power for each optical information recording and reproduction apparatus by monitoring the amplitudes of recording signals, that is, the difference between a signal level in an unrecorded portion and a signal level in a recorded portion of the recording medium, which amplitude constitutes a representative reproduction signal in the optical information recording medium.

However, it is known that the value of the amplitude of the recording signal is varied not only by the recording power, but also by the wavelength of the LD (laser diode) of the recording and reproduction apparatus, the numerical aperture of an optical pickup, the rim intensity (the intensity distribution of a laser beam which enters a condenser lens), the size or the shape of a light spot, and the pollution of the optical system with time, so that the optimum recording laser power and the quality of recorded signals are largely varied. Therefore, the conventional optical drives for the optical disk recording apparatus have been designed so as to be made compatible with different types of optical disks produced by different manufacturers thereof.

SUMMARY OF THE INVENTION

It is therefore a first object of the present invention to provide a method of recording information in a phase-change recording medium, which is free of the above-mentioned shortcomings of the conventional recording methods, and has the following features: The method includes a test recording step and is capable of attaining high recording performance without resort to a particularly selected combination of a rewritable compact disk and a compact disk drive, and also is capable of significantly improving the initial characteristics and overwrite characteristics of the rewritable compact disks and compact disk drives used therewith. The method is also suitable for performing recording and erasing of information, using a compact disk with a rotation speed in a wide range of 1.2 m/s to 22.4 m/s in terms of line speed.

A second object of the present invention is to provide a phase-change recording medium which is produced by the above-mentioned recording method.

The first object of the present invention can be achieved by a method of recording information in a phase-change recording medium comprising the steps of:

conducting a test recording with the application of a laser beam to the phase-change recording medium, the laser beam comprising a plurality of pulse trains, each pulse train comprising alternately (a) a comb-shaped pulse train portion and (b) a flat pulse-free portion, with a duty ratio of the comb-shaped pulse train portion being changed, thereby recording a plurality of signals in the recording medium, reproducing the plurality of recorded signals, and obtaining the relationship between the amplitudes of signals reproduced from the recorded signals and the duty ratios corresponding thereto in order to specify a pulse strategy for recording information in the phase-change recording medium.

More specifically, the first object of the present invention can be achieved by a method of recording information in a phase-change recording medium with a predetermined recording line speed, comprising the steps of:

conducting a test recording with the application of a laser beam to a predetermined portion of the phase-change recording medium, the laser beam comprising a plurality of pulse trains, each pulse train comprising alternately (a) a comb-shaped pulse train portion comprising a plurality of pairs of pulses, one with a pulse width T1 and a recording power P1, and the other with a pulse width T2 and a recording power P3, and (b) a flat pulse-free portion with a recording power P2, wherein P1, P2 and P3 are in the relationship of P1>P2≧P3 in terms of the intensity of the light of the laser beam, and each of the comb-shaped pulse train portion and the flat pulse-free portion has the same duration width, with a duty ratio of the comb-shaped pulse train portion, defined by T1/(T1+T2) wherein 1/(T1+T2) is a clock frequency, being changed, thereby recording a plurality of signals in the recording medium, reproducing the plurality of recorded signals to obtain reproduced signals corresponding to the plurality of recorded signals and to determine the amplitudes of the respective reproduced signals, and obtaining the relationship between the amplitudes of the respective reproduced signals and the duty ratios corresponding thereto in order to specify a pulse strategy for recording information in the phase-change recording medium.

By use of the above-mentioned method, an appropriate recording pulse can be selectively set to such a degree of precision that is sufficient for use in practice, without optical information recording and reproducing apparatus, in particular, a mass-produced one, suffering any effects of the amplitude of a recording signal and a recording power offset, which effects are apt to become evident among such optical information recording and reproducing apparatus.

The above-mentioned method may further comprise the step of selectively designating (1) at least one amplitude with a magnitude of at least 80% of that of a maximum amplitude from the amplitudes of the respective reproduced signals and (2) the duty ratio corresponding thereto, whereby an appropriate pulse strategy for recording information can be specified efficiently, with higher precision, and the production costs for the optical information recording and reproducing apparatus for use with this method can be reduced.

The above-mentioned method can also include the step of recording as an information code in the phase-change recording medium the above-mentioned relationship between the amplitudes of the respective reproduced signals and the duty ratios corresponding thereto, or at least one of (1) at least one amplitude with a magnitude of at least 80% of that of a maximum amplitude from the amplitudes of the respective reproduced signals and (2) the duty ratio corresponding thereto, whereby the recording can be carried out without the test recording for each recording medium can be avoided, and exclusive tracks for the test recording can be eliminated the phase-change recording medium.

Furthermore, the above-mentioned method may further comprise the step of recording the recording power P1 in advance as an information code in the phase-change recording medium, whereby the mechanism of the optical information recording and reproducing apparatus for use with this method can be simplified, and the speed of the recording operation thereof can be increased.

The first object of the present invention can also be achieved by a method of recording information in a phase-change recording comprising the steps of:

conducting a test recording with the application of a laser beam to the phase-change recording medium, the laser beam comprising a comb-shaped pulse train, with a duty ratio of the comb-shaped pulse train being changed, thereby forming laser-beam applied portions in the recording medium, applying light to the laser-beam applied portions to measure the intensities of the light reflected from the laser-beam applied portions, and obtaining the relationship between the intensities of the light and the duty ratios corresponding thereto in order to specify a pulse strategy for recording information in the phase-change recording medium.

More specifically, the first object of the present invention can also be achieved by a method of recording information in a phase-change recording medium with a predetermined recording line speed, comprising the steps of:

conducting a test recording with the application of a laser beam to a predetermined portion of the phase-change recording medium, the laser beam comprising a comb-shaped pulse train which comprises a plurality of pairs of pulses, one with a pulse width T1 and a recording power P1, and the other with a pulse width T2 and a recording power P3, wherein P1 and P3 are in the relationship of P1>P3 in terms of the intensity of the light of the laser beam, with a duty ratio of the comb-shaped pulse train, defined by T1/(T1+T2) wherein 1/(T1+T2) is a clock frequency, being changed, thereby forming laser-beam applied portions in the recording medium, applying light to the laser-beam applied portions to measure the intensities of the light reflected from the laser-beam applied portions, and obtaining the relationship between the intensities of the light and the duty ratios corresponding thereto in order to specify a pulse strategy for recording information in the phase-change recording medium.

The above-mentioned method may further comprise the step of selectively designating (1) at least one intensity of the light which is at least 80% of a maximum intensity of the light from the intensities of the light and (2) the duty ratio corresponding thereto.

The above-mentioned method can also include the step of recording as an information code in the phase-change recording medium the above-mentioned relationship between the intensities of the light and the duty ratios corresponding thereto, or at least one of (1) at least one intensity of the light which is at least 80% of a maximum intensity of the light from the intensities of the light and (2) the duty ratio corresponding thereto.

Furthermore, the above-mentioned method may further comprise the step of recording the recording power P1 in advance as an information code in the phase-change recording medium.

The first object of the present invention can also be achieved by the first mentioned method of recording information in a phase-change recording medium, with the addition of the steps of:

designating one duty ratio from the relationship between the amplitudes of the respective reproduced signals and the duty ratios corresponding thereto, conducting a test recording with the application of a laser beam to a predetermined portion of the phase-change recording medium, the laser beam comprising a plurality of pulse trains, each pulse train comprising alternately (a) a comb-shaped pulse train portion comprising a plurality of pairs of pulses, one with a pulse width T1 and a recording power P4, and the other with a pulse width T2 and a recording power P6, and (b) a flat pulse-free portion with a recording power P5, wherein P4, P5 and P6 are in the relationship of P4>P5≧P6 in terms of the intensity of the light of the laser beam, and each of the comb-shaped pulse train portion and the flat pulse-free portion has the same duration width, with the recording power P4 being changed, thereby recording a plurality of signals in the recording medium, reproducing the plurality of recorded signals to obtain reproduced signals corresponding to the recorded signals and to determine the amplitudes of the respective reproduced signals, and obtaining the relationship between the amplitudes of the respective reproduced signals and the recording powers P4 corresponding thereto in order to specify a pulse strategy for recording information in the phase-change recording medium, in which P4, P5 and P6 may be respectively the same as or different from P1, P2, and P3 in the first mentioned method.

The above-mentioned method may further comprise the step of selectively designating (1) at least one amplitude with a magnitude of at least 80% of that of a maximum amplitude from the amplitudes of the respective reproduced signals and (2) the recording powers P4 corresponding thereto.

Furthermore, the above-mentioned method may further comprise the step of recording as an information code in the phase-change recording medium the relationship between the amplitudes of the respective reproduced signals and the recording powers P4 corresponding thereto.

Furthermore, the above-mentioned method may further comprise the step of recording as an information code in the phase-change recording medium at least one of (1) at least one amplitude with a magnitude of at least 80% of that of a maximum amplitude from the amplitudes of the respective reproduced signals and (2) the recording power P4 corresponding thereto.

The second object of the present invention can be achieved by a phase-change recording medium produced by any of the above-mentioned methods for use in a method of recording information in an optical information recording medium with a predetermined recording line speed, wherein any of the above-mentioned information codes is recorded in advance in a predetermined portion of the phase-change recording medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will now be explained in detail with reference to the accompanying drawings.

Figure 1:
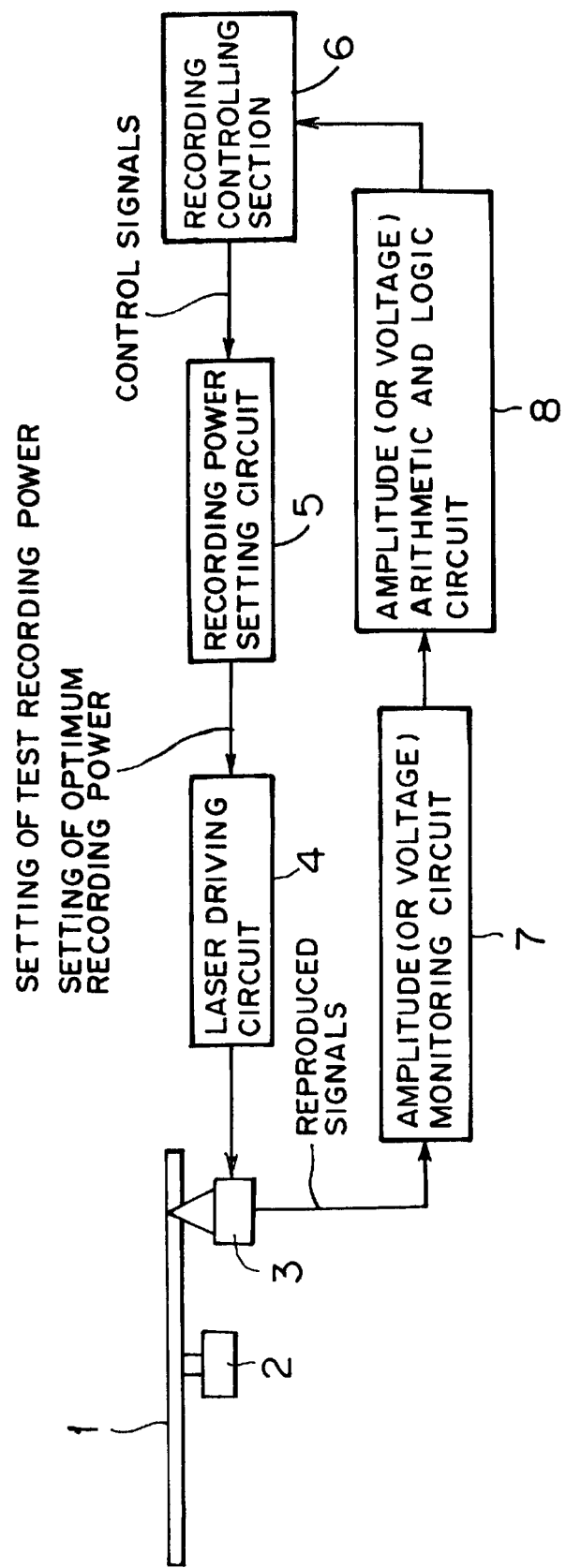
FIG. 1 is a block diagram of an example of a system for carrying out a method of recording information in a phase-change recording medium of the present invention.

FIG. 1 is a schematic diagram of a phase-change optical disk and an information recording and reproducing apparatus to which the present invention is applied, in which there is employed a laser beam for recording with a pulse wave of 3T signals.

In this example, a phase-change optical recording medium 1 comprising a phase-change optical disk is driven in rotation by driving means 2 comprising a spindle motor. A light source comprising a semi-conductor laser is driven in activation by a laser driving circuit 4 which serves as light source driving means through a recording and reproduction pickup 3, so that a laser beam is applied as magnetic wave to the phase-change optical recording medium 1 by the semi-conductor laser through an optical system (not shown). Thus, phase changes are caused in a recording layer of the phase-change optical recording medium 1, whereby information is recorded in the optical recording medium 1 by the recording and reproducing pickup 3, and recorded information is reproduced therefrom by the recording and reproducing pickup 3 receiving light reflected by the optical recording medium 1.

A recording power setting circuit 5 serving as recording power setting means is controlled by a recording controlling section 6 comprising recording controlling means, which controls the recording control system for this apparatus in its entirety, so that a test recording power and an optimum recording power for the recording and reproduction pickup 3 are set. More specifically, the recording controlling section 6 sets both the test recording power and the optimum recording power through the recording power setting circuit 5, the laser driving circuit 4 and the recording and reproduction pickup 3.

The laser driving circuit 4 causes the semi-conductor laser of the recording and reproduction pickup 3 to emit a laser beam with the test recording power or with the optimum recording power, which is set by the recording power setting circuit 5.

When setting the recording power, the laser driving circuit 4 is driven so as to cause the laser of the recording and reproducing pickup 3 to emit light in accordance with the test recording power which is set by the recording power setting circuit 5 so as to be successively changed.

The recording and reproducing pickup 3 performs test recordings, with the recording power being successively changed in each test recording, so as to record in the optical recording medium 1 a recording pattern composed of an unrecorded portion and a recorded portion, and then reproduces the information recorded in the test recordings.

An amplitude monitoring circuit 7 for monitoring the amplitude of recording signal monitors the amplitude (m) of the recording signal corresponding to the recording power P, based on the reproduced signal which is output from the recording and reproducing pickup 3. The amplitude (m) of the recording signal is assessed as the difference between the signal level in the unrecorded portion and that in the recorded portion.

An amplitude arithmetic and logic circuit 8 determines an appropriate duty ratio from both the test recording power P set by the recording power setting circuit 5 and the amplitude (m) of the recording signal set by the amplitude monitoring circuit 7, so that the determined appropriate duty ratio is set in the recording power setting circuit 5.

The recording and reproducing apparatus used in this example is such that a laser beam is applied as magnetic wave to the optical recording medium 1 by the recording and reproducing pickup 3 to cause a phase-change in the recording layer of the optical recording medium 1 to record, reproduce and rewrite information. The recording and reproducing apparatus is provided with recording means which is capable of recording information in the optical recording medium 1 by the recording and reproducing pickup 3 by modulating signals to be recorded in a modulating section.

The recording means including this pickup performs recording of information by a so-called PWM recording system which records signals in the form of a mark width in the recording layer of the optical recording medium 1.

The recording means modulates the signals to be recorded, using a clock in the modulating section, for example, by an EFM modulation system which is suitable for recording information in a rewritable compact disk, or by an improved EFM modulation system.

Generally, the recording of signal 1 (a "1" portion of a binary digital signal) in the phase-change information recording medium is carried out by forming an amorphous phase portion in the recording layer of the phase-change information recording medium. For the formation of the amorphous phase portion in the recording layer of the phase-change information recording medium, it is required that the recording layer be heated to the melting point thereof or above, and then be cooled with a sufficiently high cooling speed. More specifically, a leading edge portion for a recording mark by heating the recording layer of the phase-change information recording medium to the melting point thereof or above by a pulse portion fp, an intermediate portion of the recording mark was formed in the recording layer by elevating the temperature of the recording layer by a multipulse portion mp, and a rear edge portion of the recording mark is formed by cooling the recording layer by a pulse portion up.

When the line speed of the phase-change information recording medium is changed, the irradiation amount of the magnetic wave applied thereto is changed, and accordingly changed are the temperature elevation rate for the recording layer which is heated to its melting point or above and the cooling rate of the recording layer which is thereafter cooled. Thus, by changing the line speed of the phase-change information recording medium, the temperature elevation rate for the recording layer and the cooling rate thereof can be appropriately set.

In the case where information is recorded by the PWM recording system in the recording layer of the phase-change information recording medium, the edge portions of the recording mark are caused to bear information therein, so that care must be taken that heat is not applied to the portions in which information is not to be recorded in order to avoid the occurrence of the case where the boundary between the recording portion and the non-recording portion in the recording layer becomes unclear, and/or the case where the recording portion is crystallized and erased.

Thus, it is important that heat is not excessively generated within the recording layer and the heat conduction through the recording layer is minimized in order to draw a clear distinction in the heat elevation conditions between the portion to be heated in the recording layer for recording information therein and the portion in the recording layer of which temperature is to be maintained at normal temperature, whereby the boundary between the recording portion and the non-recording portion becomes distinct and high quality recording signals can be obtained with minimum jitters.

A phase-change recording medium of the present invention can be produced by the method of the present invention, which further comprises the step of recording as an information code in the phase-change recording medium the relationship between the amplitudes of the respective reproduced signals and the duty ratios corresponding thereto.

A phase-change recording medium of the present invention can also be produced by the method of the present invention, which further comprises the step of recording as an information code in the phase-change recording medium at least one of (1) at least one amplitude with a magnitude of at least 80% of that of a maximum amplitude from the amplitudes of the respective reproduced signals and (2) the duty ratio corresponding thereto.

A phase-change recording medium of the present invention can also be produced by the method of the present invention, which further comprises the step of recording the recording power P1 in advance as an information code in the phase-change recording medium.

A phase-change recording medium of the present invention can also be produced by the method of the present invention, which further comprises the step of recording as an information code in the phase-change recording medium the relationship between the intensities of the light and the duty ratios corresponding thereto.

A phase-change recording medium of the present invention can also be produced by the method of the present invention, which further comprises the step of recording as an information code in the phase-change recording medium at least one of (1) at least one intensity of the light which is at least 80% of a maximum intensity of the light from the intensities of the light and (2) the duty ratio corresponding thereto.

Other features of this invention will become apparent in the course of the following description of exemplary embodiments, which are given for illustration of the invention and are not intended to be limiting thereof.

EXAMPLE 1

A most appropriate recording pulse train was determined for each of a double speed, a quadruple speed and a six-times speed in terms of recording line speed, using an optical information recording and reproducing apparatus provided with a LD (laser diode) with a wavelength of 780 nm, and an optical system with an aperture ratio of 0.5, and a CD/RW (compact disk rewritable).

Figure 2:
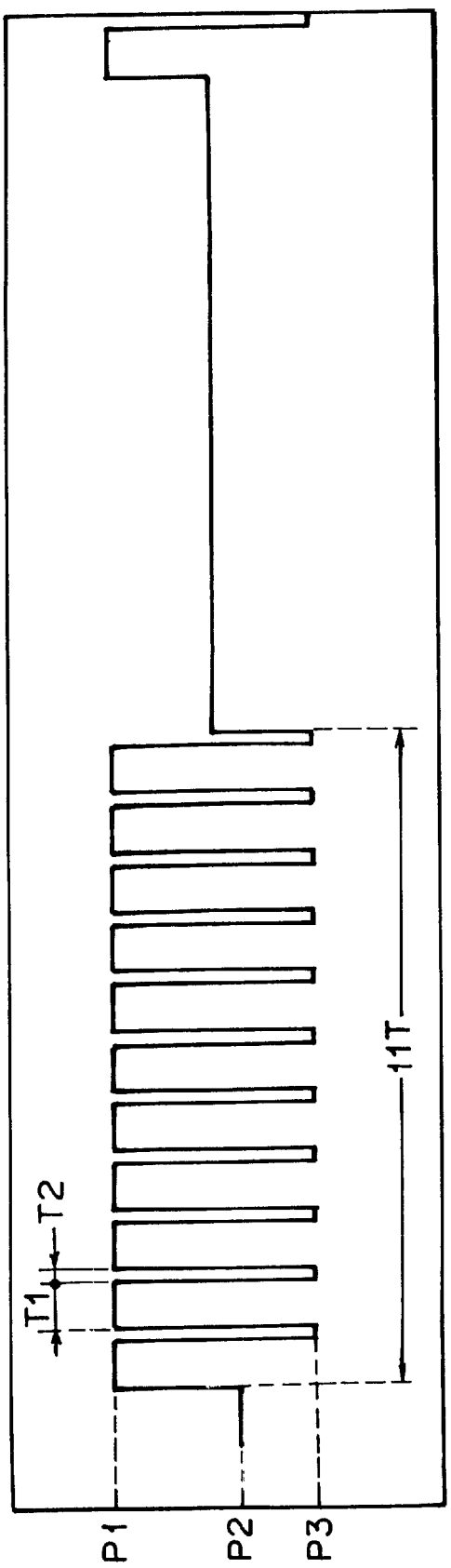
FIG. 2 is a pulse diagram of an example of a pulse train for use in the method of recording information of the present invention.

Test recordings were conducted, using a recording pulse train with a length of 11T, as shown in FIG. 2, having a clock frequency of 8.6436 MHz, 17.2872 MHz or 25.9308 MHz, respectively corresponding to the double speed, the quadruple speed and the six-times speed, wherein T is the reciprocal of the clock frequency.

In the recording pulse train, recording power P1 was 16 mW, 18 mW, and 20 mW for each line speed, recording power P2 was P1/2, and recording power P3 was 0.6 mW for each line speed.

Figure 3:
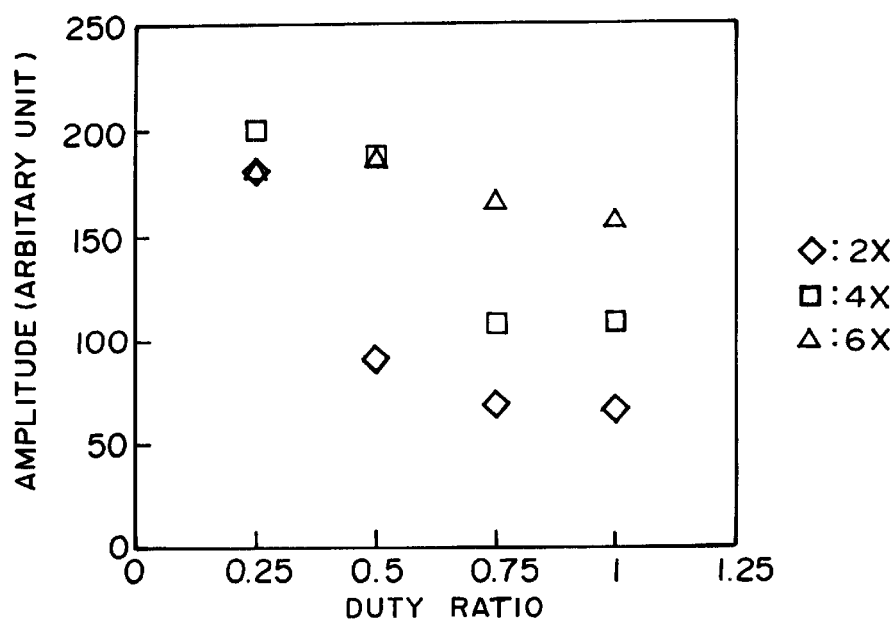
FIG. 3 is a graph showing the relationship between the amplitudes of reproduced signals and the duty ratios obtained in Example 1.

The pulse train comprised alternatively (a) a comb-shaped pulse train portion comprising a plurality of pairs of pulses, one with a pulse width T1 and the recording power P1, and the other with a pulse width T2 and the recording power P3, and (b) a flat pulse-free portion with the constant recording power P2, and each of the comb-shaped pulse train portion and the flat pulse-free portion had the same duration width of 11T, with a duty ratio of the comb-shaped pulse train portion, defined by T1/(T1+T2), being changed stepwise to 0.25, 0.5, 0.75, and 1.0, whereby the amplitudes of the recorded signals were determined. The results were as shown in FIG. 3.

The results indicate that in the combination of the above-mentioned optical information recording and reproducing apparatus and the CD-RW, the duty ratio for the appropriate recording pulse train was 0.25 at the double speed recording, 0.25 or 0.5 at the quadruple speed, and 0.5 at the six-times speed.

In the quadruple speed recording, both the duty ratio of 0.25 and the duty ratio of 0.5 could be used, but the duty ratio of 0.5 is the most appropriate. This is because the larger the duty ratio, the longer the duration of T1 and the more efficiently the energy can be used for recording, so that highly sensitive recording can be carried out with a lower power.

EXAMPLE 2

A most appropriate recording pulse train was determined for each of a double speed, a quadruple speed and a six-times speed in terms of recording line speed, using an optical information recording and reproducing apparatus provided with a LD (laser diode) with a wavelength of 780 nm, and an optical system with an aperture ratio of 0.5, and a CD-RW (compact disk rewritable).

Figure 4:
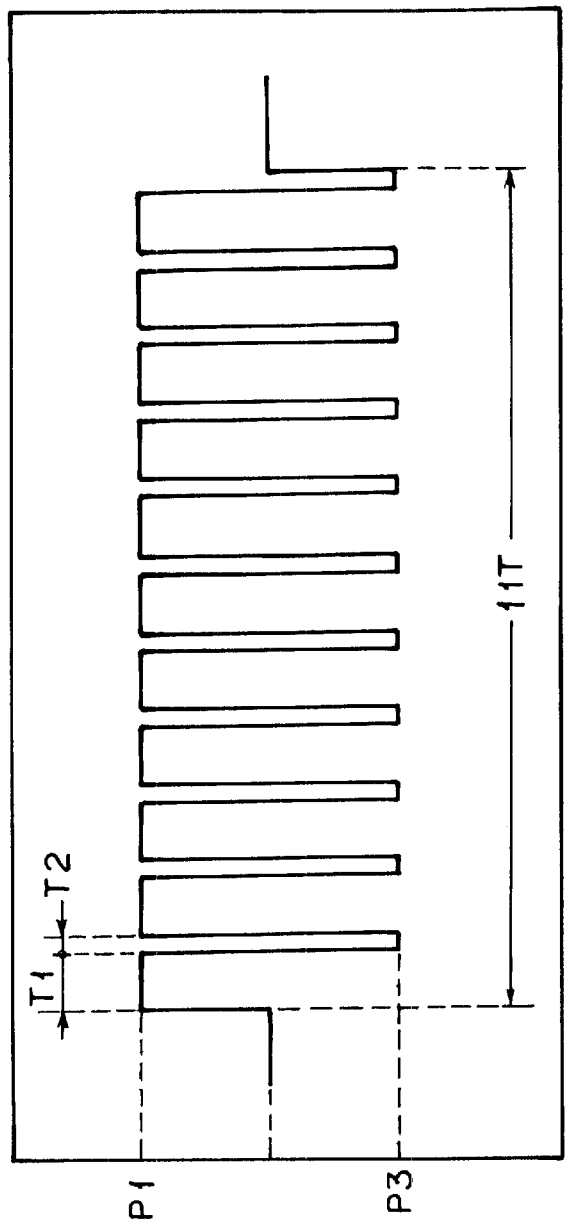
FIG. 4 is a pulse diagram of another example of a pulse train for use in the method of recording information of the present invention.

Test recordings were conducted, using a recording pulse train with a length of 11T, as shown in FIG. 4, having a clock frequency of 8.6436 MHz, 17.2872 MHz or 25.9308 MHz, respectively corresponding to the double speed, the quadruple speed and the six-times speed, wherein T is the reciprocal of the clock frequency.

In the recording pulse train, recording power P1 was 16 mW, 18 mW, and 20 mW for each line speed, and recording power P3 was 0.6 mW for each line speed.

The pulse train comprised a comb-shaped pulse train portion comprising a plurality of pairs of pulses, one with a pulse width T1 and the recording power P1, and the other with a pulse width T2 and the recording power P3, with a duty ratio of the comb-shaped pulse train portion, defined by T1/(T1+T2), being changed stepwise to 0.25, 0.5, 0.75, and 1.0.

Figure 5:
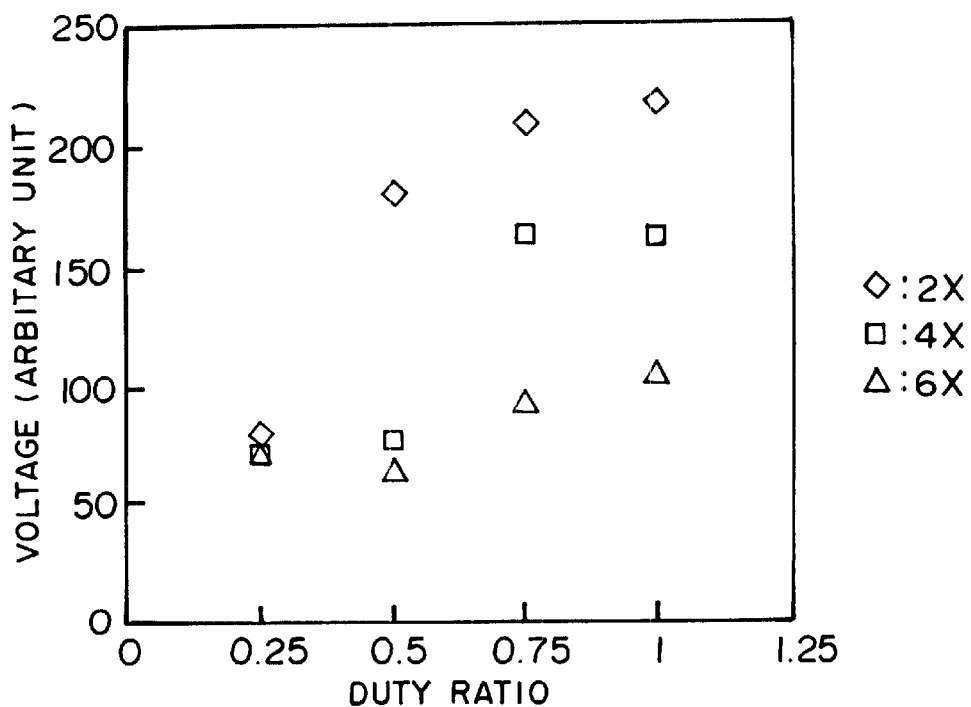
FIG. 5 is a graph showing the relationship between the relative voltages of laser-beam applied portions and the duty ratios obtained in Example 2.

Light was applied to the respective laser beam applied portions and the intensities of the light reflected by the laser-beam applied portions in the CD-RW and were converted into signals of DC voltages for comparison as shown in FIG. 5.

The values of the DC voltages corresponded to the degree of the conversion of the crystalline state to an amorphous state of the recording layer. The lower the DC voltage, the better the state of the amorphous recording mark.

The results shown in FIG. 5 indicate that in the combination of the above-mentioned optical information recording and reproducing apparatus and the CD-RW, the duty ratio for the appropriate recording pulse train was 0.25 at the double speed recording, 0.25 or 0.5 at the quadruple speed, and 0.5 at the six-times speed.

In the quadruple speed recording, both the duty ratio of 0.25 and the duty ratio of 0.5 could be used, but the duty ratio of 0.5 is the most appropriate. This is because the larger the duty ratio, the longer the duration of T1 and the more efficiently the energy can be used for recording, so that highly sensitive recording can be carried out with a lower power.

EXAMPLE 3

Figure 6:
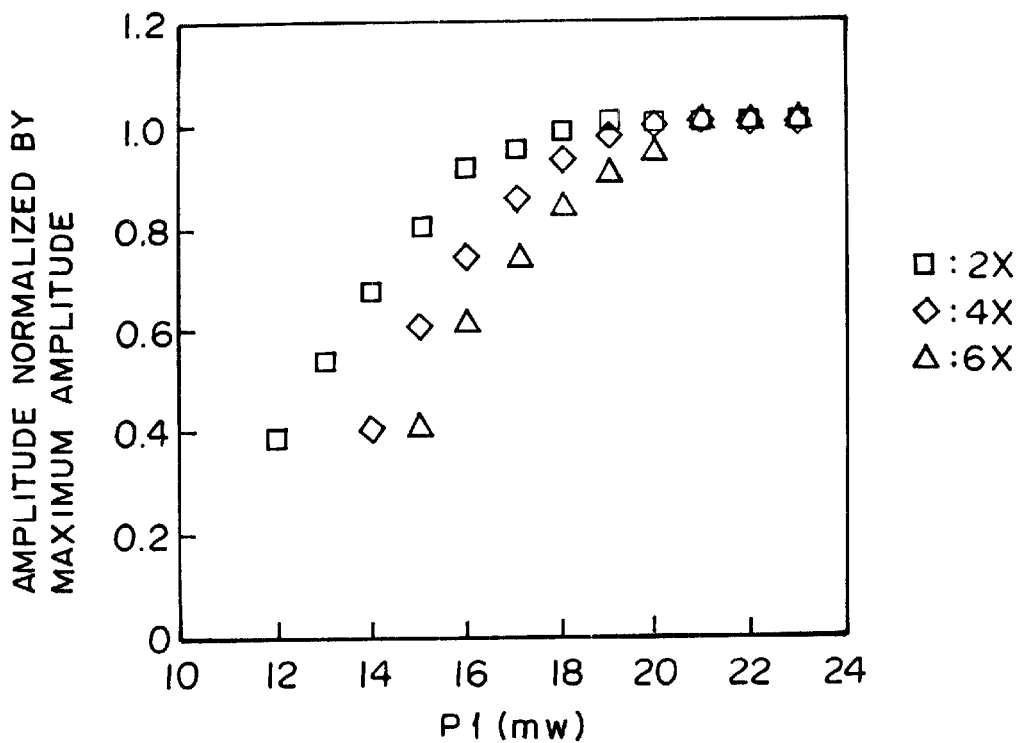
FIG. 6 is a graph showing the relationship between recording powers P1 and the amplitudes of reproduced signals obtained in Example 3.

By use of the same optical information recording and reproducing apparatus and the same CD-RW as those employed in Example 1, the same test recordings as in Example 1 were conducted at a predetermined portion of the CD-RW, using the same pulse trains as those employed in Example 1 provided that the duty ratio thereof was fixed at 0.3, and the recording power P1 was changed stepwise in the same manner as in Example 1 at the double speed, the quadruple speed and the six-times speed. As a result, the relationship between the recording powers P1 and the amplitudes of the reproduced signals was obtained as shown in the graph of FIG. 6, provided in the graph of FIG. 6, the data are plotted, with the amplitude normalized with a maximum amplitude as ordinate and the recording power P1 as abscissa.

Figure 7:
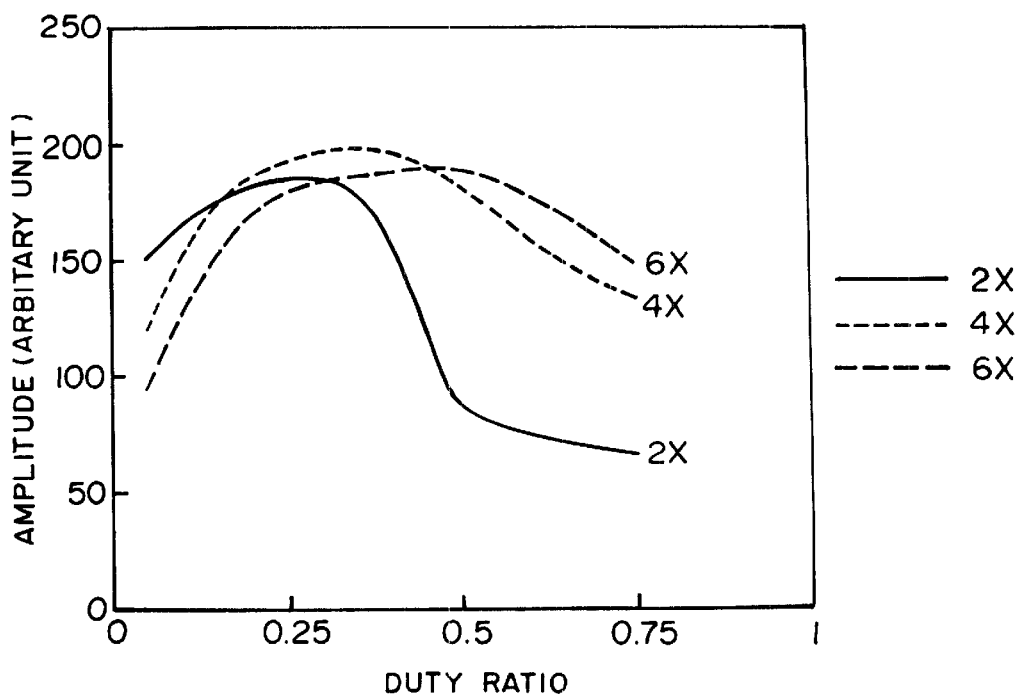
FIG. 7 is a graph showing the relationship between the recording powers P1 and the duty ratios obtained in Example 3.

Furthermore, test recordings were conducted with the recording powers P1 of 16 mW, 18 mW and 19 mW at which the amplitudes with a magnitude of at least 80% of the maximum were obtained at each of the above-mentioned line speeds, with the duty ratio being changed stepwise from 0.05 to 0.75. As a result, the relationship between the recording powers P1 and the duty ratios was obtained as shown in the graph of FIG. 7. From the thus obtained results, it was determined that the duty ratios for the most appropriate recording at the double speed, the quadruple speed and the six-times speed were respectively 0.3, 0.4 and 0.5.

EXAMPLE 4

An information code corresponding to the duty ratios of recording pulses was recorded in advance in an optical recording medium.

The information code included the duty ratios of 0.25, 0.5 and 0.5, respectively at a double speed, a quadruple speed and a six-times speed.

By use of the same optical information recording and reproducing apparatus as used in Example 1, the information code was read from the optical recording medium, and recording was carried out in the recording medium with each duty ratio in the information code. As a result, high quality signals were recorded in a stable manner, and the recorded signals were rewritten satisfactorily.

EXAMPLE 5

Recording powers P1 were recorded in advance in an optical recording medium. More specifically, recording powers P of 17 mW, 19 mW and 20 mW, respectively at a double speed, a quadruple speed and a six-times speed, were recorded in advance in the optical recording medium.

By use of the same optical information recording and reproducing apparatus as used in Example 1, the information of the recorded recording powers was read from the optical recording medium, and test recording was conducted based on the information, whereby a most appropriate duty ratio was determined.

Recording was carried out, using the most appropriate duty ratio. As a result, high quality signals were recorded in a stable manner, and the recorded signals were rewritten satisfactorily.

The above-mentioned recording powers P1 may be recorded in advance as an information code in the optical recording medium.

What is claimed is:

1. A method of recording information in a phase-change recording medium comprising the steps of:

conducting a test recording with the application of a laser beam to said phase-change recording medium, said laser beam comprising a plurality of pulse trains, each pulse train comprising alternately (a) a comb-shaped pulse train portion and (b) a flat pulse-free portion, with a duty ratio of said comb-shaped pulse train portion being changed, thereby recording a plurality of signals in said recording medium, reproducing said plurality of recorded signals, and obtaining the relationship between the amplitudes of signals reproduced from said recorded signals and the duty ratios corresponding thereto in order to specify a pulse strategy for recording information in said phase-change recording medium.

2. A method of recording information in a phase-change recording comprising the steps of:

conducting a test recording with the application of a laser beam to said phase-change recording medium, said laser beam comprising a comb-shaped pulse train, with a duty ratio of said comb-shaped pulse train being changed, thereby forming laser-beam applied portions in said recording medium, applying light to said laser-beam applied portions to measure the intensities of the light reflected from said laser-beam applied portions, and obtaining the relationship between said intensities of the light and the duty ratios corresponding thereto in order to specify a pulse strategy for recording information in said phase-change recording medium.

3. A method of recording information in a phase-change recording medium with a predetermined recording line speed, comprising the steps of:

conducting a test recording with the application of a laser beam to a predetermined portion of said phase-change recording medium, said laser beam comprising a plurality of pulse trains, each pulse train comprising alternately (a) a comb-shaped pulse train portion comprising a plurality of pairs of pulses, one with a pulse width T1 and a recording power P1, and the other with a pulse width T2 and a recording power P3, and (b) a flat pulse-free portion with a recording power P2, where P1, P2 and P3 are in the relationship of $P1 > P2 \geq P3$ in terms of the intensity of the light of said laser beam, and each of said comb-shaped pulse train portion and said flat pulse-free portion has the same duration width, with a duty ratio of said comb-shaped pulse train portion, defined by $T1/(T1+T2)$ wherein $1/(T1+T2)$ is a clock frequency, being changed, thereby recording a plurality of signals in said recording medium, reproducing said plurality of recorded signals to obtain reproduced signals corresponding to said plurality of recorded signals and to determine the amplitudes of said respective reproduced signals, and obtaining the relationship between the amplitudes of said respective reproduced signals and the duty ratios corresponding thereto in order to specify a pulse strategy for recording information in said phase-change recording medium.

4. The method of recording information in a phase-change recording medium as claimed in claim 3, further comprising the step of selectively designating (1) at least one amplitude with a magnitude of at least 80% of that of a maximum amplitude from the amplitudes of said respective reproduced signals and (2) the duty ratio corresponding thereto.

5. The method of recording information in a phase-change recording medium as claimed in claim 4, further comprising the step of recording as an information code in said phase-change recording medium said at least one of (1) at least one amplitude with a magnitude of at least 80% of that of a maximum amplitude from the amplitudes of said respective reproduced signals and (2) the duty ratio corresponding thereto.

6. A phase-change recording medium produced by the method as claimed in claim 5, for use in a method of recording information in an optical information recording medium with a predetermined recording line speed, wherein said information code is recorded in advance in a predetermined portion of said phase-change recording medium.

7. The method of recording information in a phase-change recording medium as claimed in claim 3, further comprising the step of recording as an information code in said phase-change recording medium the relationship between the amplitudes of said respective reproduced signals and the duty ratios corresponding thereto.

8. A phase-change recording medium produced by the method as claimed in claim 7, for use in a method of recording information in an optical information recording medium with a predetermined recording line speed, wherein said information code is recorded in advance in a predetermined portion of said phase-change recording medium.

9. The method of recording information in a phase-change recording medium as claimed in claim 3, further comprising the step of recording said recording power P1 in advance as an information code in said phase-change recording medium.

10. A phase-change recording medium produced by the method as claimed in claim 9, for use in a method of recording information in an optical information recording medium with a predetermined recording line speed, wherein said information code is recorded in advance in a predetermined portion of said phase-change recording medium.

11. The method of recording information in a phase-change recording medium as claimed in claim 3, further comprising the steps of:

designating one duty ratio from said relationship between the amplitudes of said respective reproduced signals and the duty ratios corresponding thereto, conducting a test recording with the application of a laser beam to a predetermined portion of said phase-change recording medium, said laser beam comprising a plurality of pulse trains, each pulse train comprising alternately (a) a comb-shaped pulse train portion comprising a plurality of pairs of pulses, one with a pulse width T1 and a recording power P4, and the other with a pulse width T2 and a recording power P6, and (b) a flat pulse-free portion with a recording power P5, wherein P4, P5 and P6 are in the relationship of $P4 > P5 \geq P6$ in terms of the intensity of the light of said laser beam, and each of said comb-shaped pulse train portion and said flat pulse-free portion has the same duration width, with said recording power P4 being changed, thereby recording a plurality of signals in said recording medium, reproducing said plurality of recorded signals to obtain reproduced signals corresponding to said recorded signals and to determine the amplitudes of said respective reproduced signals, and obtaining the relationship between the amplitudes of said respective reproduced signals and the recording powers P4 corresponding thereto in order to specify a pulse strategy for recording information in said phase-change recording medium.

12. The method of recording information in a phase-change recording medium as claimed in claim 11, further comprising the step of selectively designating (1) at least one amplitude with a magnitude of at least 80% of that of a maximum amplitude from the amplitudes of said respective reproduced signals and (2) the recording powers P4 corresponding thereto.

13. The method of recording information in a phase-change recording medium as claimed in claim 12, further comprising the step of recording as an information code in said phase-change recording medium said at least one of (1) at least one amplitude with a magnitude of at least 80% of that of a maximum amplitude from the amplitudes of said respective reproduced signals and (2) the recording power P4 corresponding thereto.

14. The method of recording information in a phase-change recording medium as claimed in claim 11, further comprising the step of recording as an information code in said phase-change recording medium the relationship between the amplitudes of said respective reproduced signals and the recording powers P4 corresponding thereto.

15. A method of recording information in a phase-change recording medium with a predetermined recording line speed, comprising the steps of:

conducting a test recording with the application of a laser beam to a predetermined portion of said phase-change change recording medium, said laser beam comprising a comb-shaped pulse train which comprises a plurality of pairs of pulses, one with a pulse width T1 and a recording power P1, and the other with a pulse width T2 and a recording power P3, wherein P1 and P3 are in the relationship of P1>P3 in terms of the intensity of the light of said laser beam, with a duty ratio of said comb-shaped pulse train portion, defined by T1/(T1+T2) wherein 1/(T1+T2) is a clock frequency, being changed, thereby forming laser-beam applied portions in said recording medium, applying light to said laser-beam applied portions to measure the intensities of the light reflected from said laser-beam applied portions, and obtaining the relationship between said intensities of the light and the duty ratios corresponding thereto in order to specify a pulse strategy for recording information in said phase-change recording medium.

16. The method of recording information in a phase-change recording medium as claimed in claim 15, further comprising the step of selectively designating (1) at least one intensity of the light which is at least 80% of a maximum intensity of the light from the intensities of the light and (2) the duty ratio corresponding thereto.

17. The method of recording information in a phase-change recording medium as claimed in claim 15, further comprising the step of recording as an information code in said phase-change recording medium the relationship between said intensities of the light and the duty ratios corresponding thereto.

18. A phase-change recording medium produced by the method as claimed in claim 17, for use in a method of recording information in an optical information recording medium with a predetermined recording line speed, wherein said information code is recorded in advance in a predetermined portion of said phase-change recording medium.

19. The method of recording information in a phase-change recording medium as claimed in claim 15, further comprising the step of recording as an information code in said phase-change recording medium said at least one of (1) at least one intensity of the light which is at least 80% of a maximum intensity of the light from the intensities of the light and (2) the duty ratio corresponding thereto.

20. A phase-change recording medium produced by the method as claimed in claim 19, for use in a method of recording information in an optical information recording medium with a predetermined recording line speed, wherein said information code is recorded in advance in a predetermined portion of said phase-change recording medium.

21. The method of recording information in a phase-change recording medium as claimed in claim 15, further comprising the step of recording said recording power P1 in advance as an information code in said phase-change recording medium.

22. A phase-change recording medium produced by the method as claimed in claim 21, for use in a method of recording information in an optical information recording medium with a predetermined recording line speed, wherein said information code is recorded in advance in a predetermined portion of said phase-change recording medium.

* * * * *